US008433333B2

United States Patent
Tran et al.

(10) Patent No.: US 8,433,333 B2
(45) Date of Patent: Apr. 30, 2013

(54) METHOD AND CONTROLLER FOR REDIRECTION OF ACTIVE USERS FROM AN UMBRELLA CELL TO CAPACITY CELLS

(75) Inventors: Scott Tran, Plano, TX (US); Michael Woodmansee, Plano, TX (US); Gordon Edwards, Red Deer (CA); Kashif Hussain, Murphy, TX (US); Martin Kendall, Wylie, TX (US); Miroslav Budic, Murphy, TX (US); Abdennaceaur Lachtar, Plano, TX (US); Yves Choiniere, Calgary (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 275 days.

(21) Appl. No.: 12/789,253

(22) Filed: May 27, 2010

(65) Prior Publication Data

US 2011/0294503 A1    Dec. 1, 2011

(51) Int. Cl.
*H04W 24/00* (2009.01)
*H04W 4/00* (2009.01)
*H04W 36/00* (2009.01)

(52) U.S. Cl.
USPC ........... 455/453; 455/434; 455/436; 455/421; 370/331; 370/338

(58) Field of Classification Search ............. 455/434
See application file for complete search history.

(56) References Cited

U.S. PATENT DOCUMENTS

| 6,480,716 B2 * | 11/2002 | Salonaho ............. 455/441 |
| 6,564,058 B1 | 5/2003 | Flewitt et al. |
| 2002/0111158 A1 * | 8/2002 | Tee ............. 455/421 |
| 2007/0049277 A1 * | 3/2007 | Nakamata et al. ........ 455/436 |
| 2007/0140185 A1 * | 6/2007 | Garg et al. ............. 370/338 |
| 2008/0101311 A1 * | 5/2008 | Bernhard et al. ......... 370/342 |

FOREIGN PATENT DOCUMENTS

| EP | 2 071 881 A1 | 6/2009 |
| WO | WO 2010/043583 A2 | 4/2010 |

* cited by examiner

*Primary Examiner* — Lester Kincaid
*Assistant Examiner* — Andy Gu

(57) ABSTRACT

A radio network controller of a wireless telecommunications network having an umbrella cell base station for an umbrella cell and capacity cell base stations for capacity cells within the umbrella cell includes a network interface from which a message is sent to the umbrella base station of the umbrella cell to search for capacity cells within the umbrella cell to redirect traffic of an AT from the umbrella cell to at least one of the capacity cells, and at which eligible capacity cells to which traffic of the AT can be redirected is received. The controller includes a processing unit which selects target capacity cells from the eligible capacity cells to which traffic of the AT will be redirected. A method for a radio network controller of a wireless telecommunications network having an umbrella cell base station for an umbrella cell and capacity cell base stations for capacity cells within the umbrella cell.

10 Claims, 8 Drawing Sheets

US 8,433,333 B2

METHOD AND CONTROLLER FOR REDIRECTION OF ACTIVE USERS FROM AN UMBRELLA CELL TO CAPACITY CELLS

FIELD OF THE INVENTION

The present invention is related to redirecting active users from an umbrella cell to capacity cells within the umbrella cell of a wireless telecommunications network. (As used herein, references to the "present invention" or "invention" relate to exemplary embodiments and not necessarily to every embodiment encompassed by the appended claims.) More specifically, the present invention is related to redirecting active users from an umbrella cell to capacity cells within the umbrella cell of a wireless telecommunications network by sending a message to search for capacity cells within the umbrella cell to redirect traffic of an access terminal (AT) from the umbrella cell to at least one of the capacity cells and then selecting target capacity cells from eligible capacity cells to which traffic of the AT will be redirected.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The EVDO deployment requires deploying an umbrella cell/sector to cover multi capacity cells/sectors. The coverage radius of the umbrella cells are about 50 Km. The number of capacity cells within the RF coverage of an umbrella cell is between 30 cells to 45 cells. These capacity cells are deployed in the areas such as towns, residential areas, and so on, and traffic capacity requires more than 1 carrier. Refer to FIG. 1 for this pictorial description.

There is no good solution/application to direct EVDO active connections from umbrella cell to capacity cell(s) where the umbrella cell and capacity cell require deploying with an inter-carrier (with current product).

This invention will use the RouteUpdateRequest Message (with ChannelIncluded=1) sending on umbrella cell carrier to request active connection ATs to measure and report the pilot Ec/Io level of the off-frequency capacity cell(s). The techniques to send a search list or search lists and to construct the target list are important to this invention.

Problems with Existing Solutions

With current products, in order to direct active traffics from umbrella cell carrier to capacity cells magnet/beacon carriers on the umbrella frequency are created to redirect connection attempts and active connections to capacity sites via MCTA and IFHHO respectively. See FIG. 2. This method of deployment requires extra hardware for each capacity cell and the expansion of Neighbor List size to 40. The requirement of extra hardware (DOMs) for each capacity cell would be very costly.

BRIEF SUMMARY OF THE INVENTION

The present invention pertains to a radio network controller of a wireless telecommunications network having an umbrella cell base station for an umbrella cell and capacity cell base stations for capacity cells within the umbrella cell. The controller comprises a network interface from which a message is sent to the umbrella base station of the umbrella cell to search for capacity cells within the umbrella cell to redirect traffic of an AT from the umbrella cell to at least one of the capacity cells, and at which eligible capacity cells to which traffic of the AT can be redirected is received. The controller comprises a processing unit which selects target capacity cells from the eligible capacity cells to which traffic of the AT will be redirected.

The present invention pertains to a method for a radio network controller of a wireless telecommunications network having an umbrella cell base station for an umbrella cell and capacity cell base stations for capacity cells within the umbrella cell. The method comprises the steps of sending a message from a network interface to the umbrella base station of the umbrella cell to search for capacity cells within the umbrella cell to redirect traffic of an AT from the umbrella cell to at least one of the capacity cells. There is the step of receiving at the network interface from the umbrella base station eligible capacity cells to which traffic of the AT can be redirected. There is the step of selecting with a processing unit target capacity cells from the eligible capacity cells to which traffic of the AT will be redirected.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
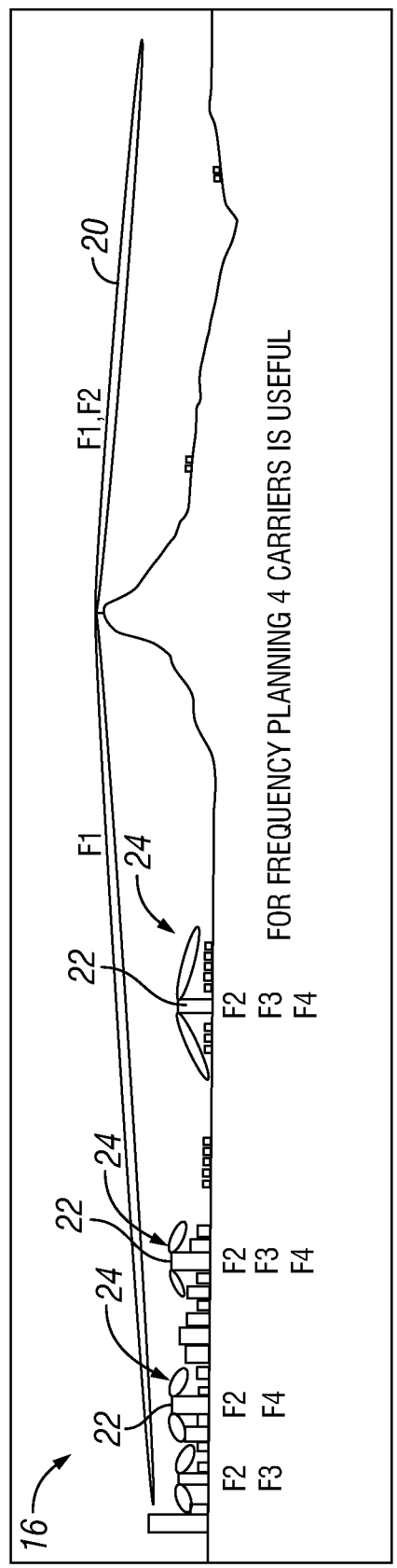
FIG. 1 shows an umbrella boomer cell overloading capacity cells.
Figure 2:
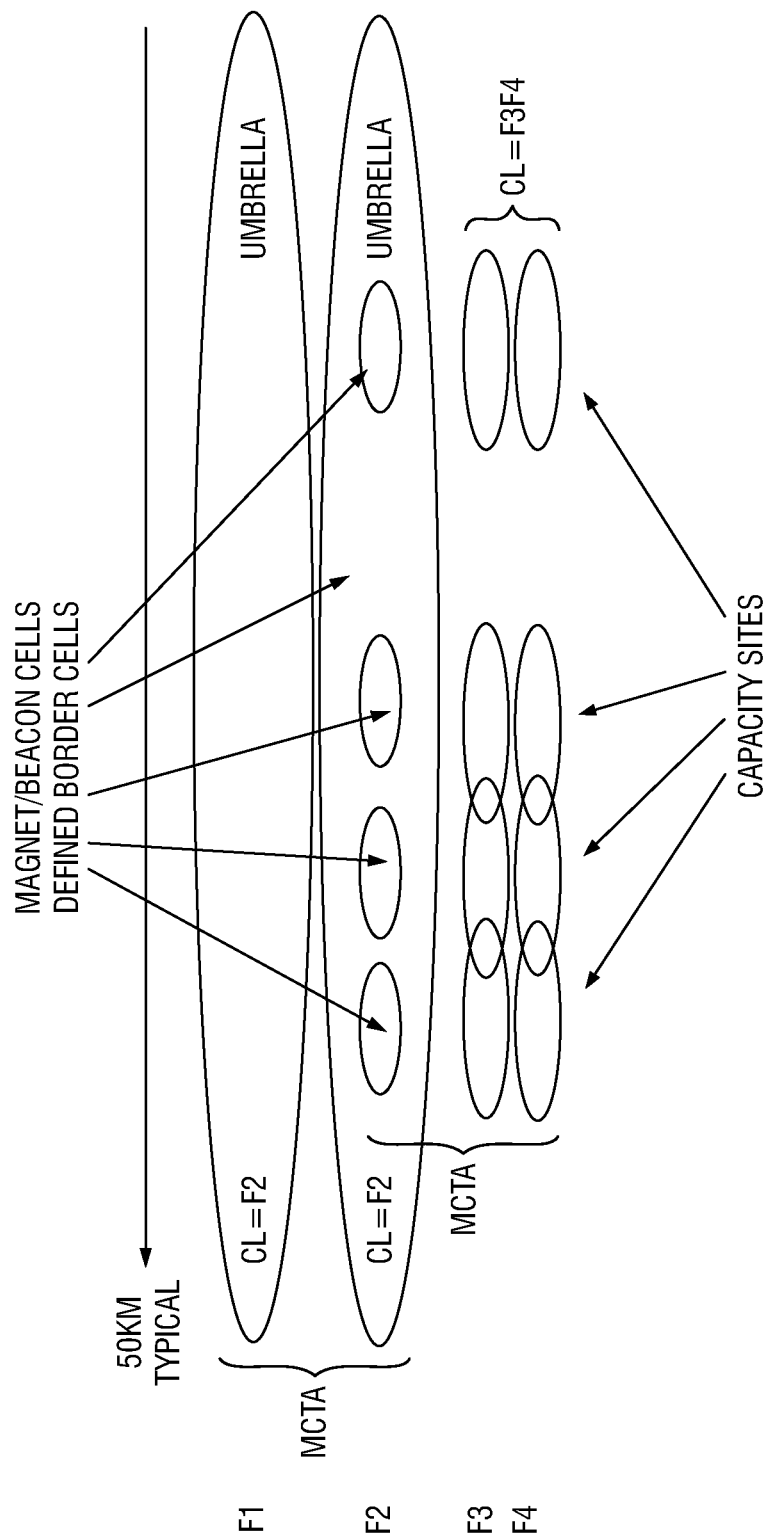
FIG. 2 shows magnet/beacon cells, defined border cells and capacity sites with respect to the prior art.
Figure 3:
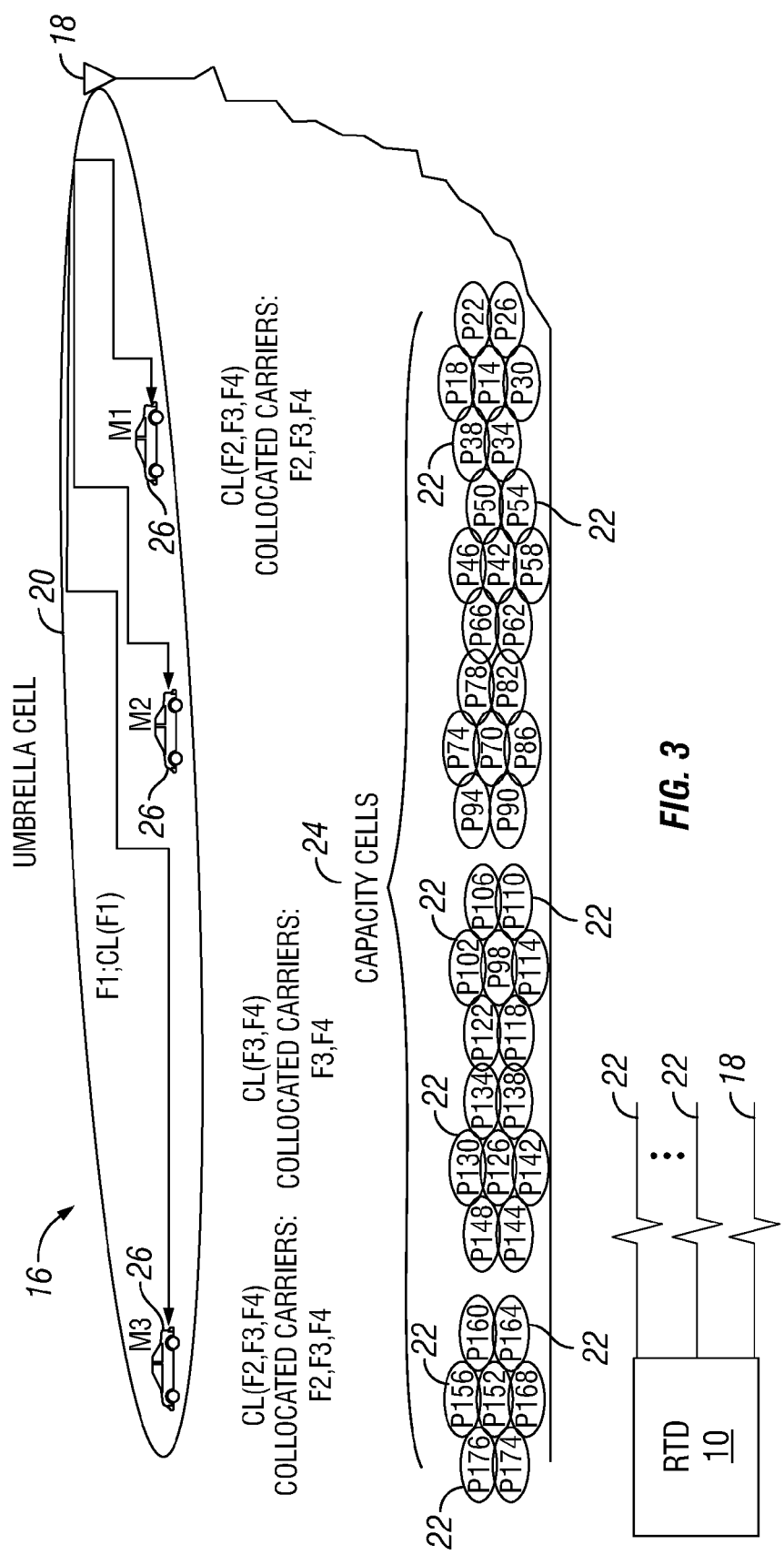
FIG. 3 shows an umbrella cell and capacity cells in regard to the present invention.
Figure 10:
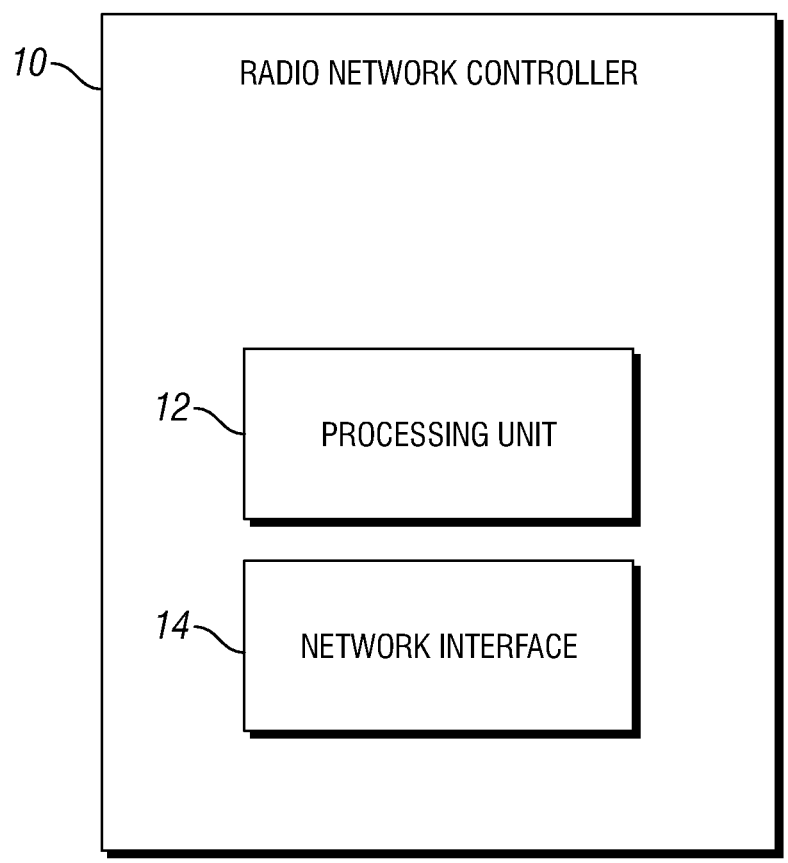
FIG. 10 is a block diagram of a radio network controller of the present invention.

Referring now to the drawings wherein like reference numerals refer to similar or identical parts throughout the several views, and more specifically to FIGS. 3 and 10 thereof, there is shown a radio network controller 10 of a wireless telecommunications network 16 having an umbrella cell base station 18 for an umbrella cell 20 and capacity cell base stations 22 for capacity cells 24 within the umbrella cell 20. The controller comprises a network interface 14 from which a message is sent to the umbrella base station of the umbrella cell 20 to search for capacity cells 24 within the umbrella cell 20 to redirect traffic of an AT 26 from the umbrella cell 20 to at least one of the capacity cells 24, and at which eligible capacity cells 24 to which traffic of the AT 26 can be redirected is received. The controller comprises a processing unit 12 which selects target capacity cells 24 from the eligible capacity cells 24 to which traffic of the AT 26 will be redirected.

The processing unit 12 may cause the traffic of the AT 26 from the umbrella cell 20 to be redirected to the target capacity cells 24. The processing unit 12 may create at least one search list of capacity cells 24 to search. The processing unit 12 may create at least one search list based on round-trip delay. The processing unit 12 may create at least one search list based on round-robin. The processing unit 12 may create the search list based on round-trip delay and round-robin.

The network interface 14 may send the message to the umbrella base station to send a RouteUpdateRequest message to the AT 26 for the AT 26 to search for capacity cells 24 in the search list. The network interface 14 may receive eligible capacity cells 24 which have a power level greater than a predetermined power level. The network interface 14 may receive eligible capacity cells 24 which have an Ec/Io power level greater than a predetermined Ec/Io power level.

The processing unit 12 may select each eligible capacity cell as a target cell when there are four or more eligible capacity cells 24. The processing unit 12 may select at least one neighbor capacity cell of each eligible capacity cell and also the eligible capacity cell when there are between 1 and 3 eligible capacity cells 24. The processing unit 12 may select selects 2 neighbor capacity cells 24 for each eligible capacity cell and also the eligible capacity cell when there are 2 eligible capacity cells 24, selecting 1 neighbor capacity cell for each eligible capacity cell and also the eligible capacity cell when there are 3 eligible capacity cells 24, and selecting 5 neighbor capacity cells 24 when there is only 1 eligible capacity cell and also the 1 eligible capacity cell.

The present invention pertains to a method for a radio network controller 10 of a wireless telecommunications network 16 having an umbrella cell base station 18 for an umbrella cell 20 and capacity cell base stations 22 for capacity cells 24 within the umbrella cell 20. The method comprises the steps of sending a message from a network interface 14 to the umbrella base station of the umbrella cell 20 to search for capacity cells 24 within the umbrella cell 20 to redirect traffic of an AT 26 from the umbrella cell 20 to at least one of the capacity cells 24. There is the step of receiving at the network interface 14 from the umbrella base station eligible capacity cells 24 to which traffic of the AT 26 can be redirected. There is the step of selecting with a processing unit 12 target capacity cells 24 from the eligible capacity cells 24 to which traffic of the AT 26 will be redirected.

There may be the step of redirecting the traffic of the AT 26 from the umbrella cell 20 to the target capacity cells 24. The sending step may include the step of creating at least one search list of capacity cells 24 to search. The creating step may include the step of creating at least one search list based on round-trip delay. The creating step may include the step of creating at least one search list based on round-robin. The creating step may include the step of creating the search list based on round-trip delay and round-robin.

The sending step may include the step of sending the message to the umbrella base station to send a RouteUpdateRequest message to the AT 26 for the AT 26 to search for capacity cells 24 in the search list. The receiving step may include the step of receiving eligible capacity cells 24 which have a power level greater than a predetermined power level. The receiving eligible capacity cells 24 step may include the step of receiving eligible capacity cells 24 which have an Ec/Io power level greater than a predetermined Ec/Io power level.

The selecting step may include the step of selecting each eligible capacity cell is a target cell when there are four or more eligible capacity cells 24. The selecting step may include the step of selecting at least one neighbor capacity cell of each eligible capacity cell and also the eligible capacity cell when there are between 1 and 3 eligible capacity cells 24. The selecting step may include the step of selecting 2 neighbor capacity cells 24 for each eligible capacity cell and also the eligible capacity cell when there are 2 eligible capacity cells 24, selecting 1 neighbor capacity cell for each eligible capacity cell and also the eligible capacity cell when there are 3 eligible capacity cells 24, and selecting 5 neighbor capacity cells 24 when there is only 1 eligible capacity cell and also the 1 eligible capacity cell.

In the operation of the invention, techniques are used to send multiple mutually exclusive search lists on an umbrella cell 20 carrier to request active connection ATs to measure and report the pilot Ec/Io level of off-frequency capacity cell(s). The techniques are based on the following:

RTD zone based method
Periodic round robin method
Combination of the above two methods The radio network controller (RNC) will trigger the redirection (Handoff) active connection if measured Ec/Io level is >=configured threshold. Note: the search list(s) will send via RouteUpdateRequest message with ChannelIncluded=1. Techniques are also used to build a robust target(s) list for improving call completion during redirection or hard handoff.

The IS856 standard defines a RouteUpdateRequest message. This standard indicates that if the access network sends the RouteUpdateRequest message with channel record information to the AT 26 (Access Terminal), then the channel included field in the message should be set to 1.

Implementation occurs in an embodiment using a RouteUpdateRequest Message (RUR) with ChannelIncluded=1 sent on an umbrella cell 20 carrier to request active connection ATs to report the Ec/Io levels of off-frequency capacity cells 24. Ec/Io (pilot strength) is the received pilot energy over one PN chip period (Ec) divided by the total power spectral density (Io) in the received bandwidth or the total received energy of the outer cells and in-cell in the received bandwidth. If the reported Ec/Io greater >=the configured Ec/Io Threshold, direct the connection to capacity cell(s). "Configured Ec/Io threshold" is the software implementation to allow users to control when an active connection (call) on the umbrella cell 20 carrier should be directed to a capacity cell carrier. For example if the AT 26 reported Ec/Io=−5 dB and −5 dB is greater than the configured threshold then the redirection is granted.

With reference to FIG. 3, and the definitions of abbreviations section below, M1 is mobile1 or AT1, F1=frequency carrier 1, CL(F1) is the channel list of carrier F1 configured with channel number of F1. This channel list advertises to the ATs in the coverage of this carrier sector that F1 is the carrier in operation. CL(F2, F3, F4) collocated carriers: F2, F3, F4 means the channel list of each carrier, F2, F3, F4, that is configured with the list of CDMA channel numbers: F2, F3, and F4. This channel list advertises to the ATs that F2, F3, and F4 are the carriers in operation.

A search list is limited to up to 16 entries with channel record and pilot PN. This is because IS856 indicates that the maximum number of entries for the list of Pilot PNs in the RouteUpdateRequest message is 16. The channel record identifies Band Class of the carrier and the channel number of the carrier. Furthermore, IS856 dictates that the AT 26 can only have up to six pilots in its active set (or can communicate with up to six pilots/links/cells). In other embodiments, the AT 26 could have more than six pilots and the list could have more than 16 entries.

A Search_List will be sent via RUR. The Search_List may be formed the following ways.

1. Sending Search_List(s) per RTD based method (1)
2. Sending Search_List(s) per periodic round-robin method (2)
3. Sending Search_List(s) per method (1) and method (2)

Each Search_List may be configured with up to 16 entries with channel record and Pilot PN based on IS856.

A Specific Search_List (SList) will be sent corresponding to a specific RTD_zone. For example, RTD_zone1: Search_List#1 will be sent if RTDmin<AT reported RTD<RTD1

RTD_zone2: Search_List#2 will be sent if RTD1<AT reported RTD<RTD2

Figure 4:
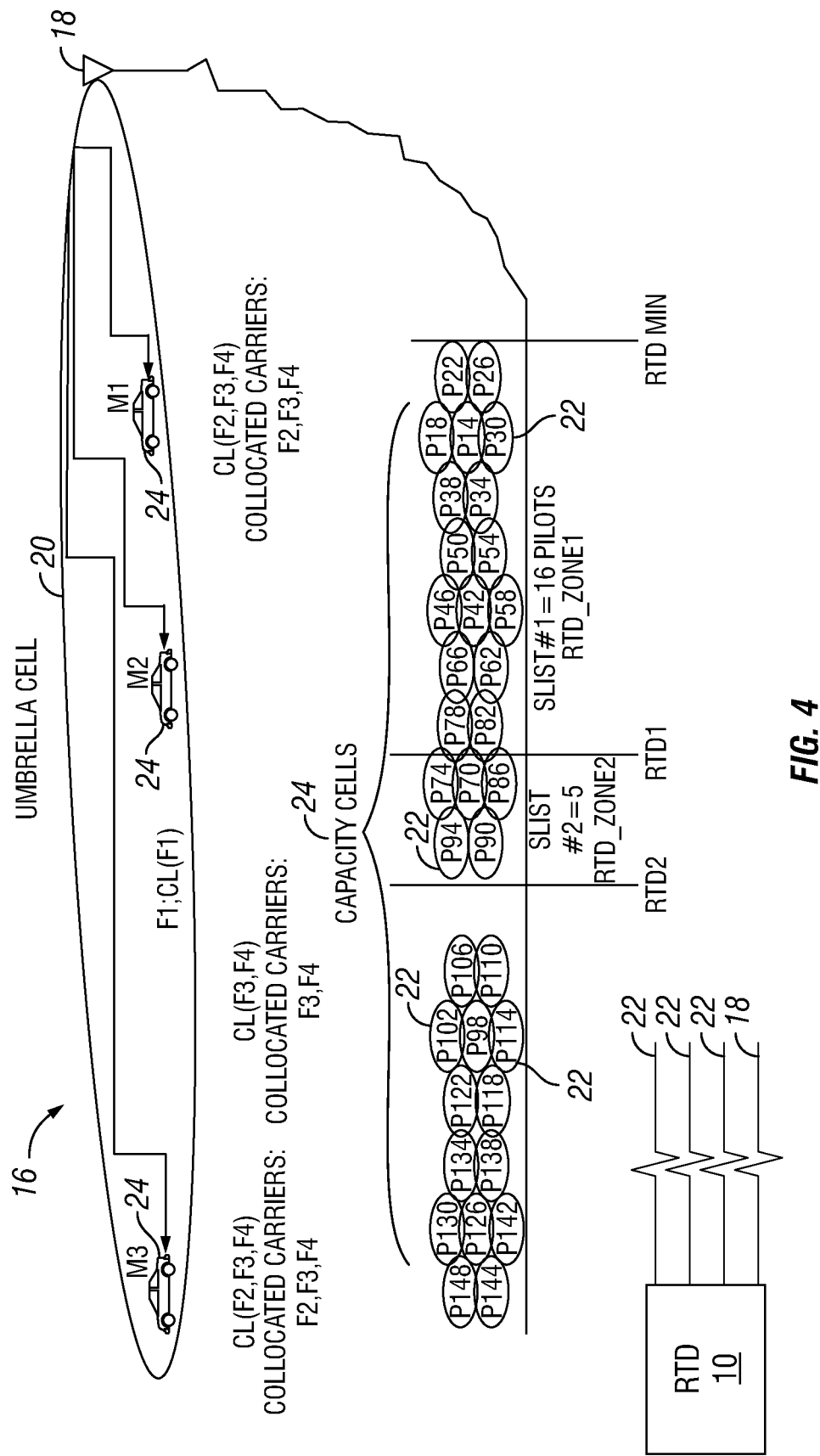
FIG. 4 shows an umbrella cell and capacity cells with at least two zones.

In regard to FIG. 4, under the RF coverage of an umbrella cell 20/sector, its RF coverage is divided radially into several zones. For example, if the AT 26 reported/measured RTD is greater than the configured RTDmin value and less than the configured RTD1 value, then the RNC (Radio network controller 10) will send out a search list corresponding to this RTD zone. For this example, the RTD zone is RTD_zone1 and the search list is Search_List#1. It should be noted that RTD is the round trip delay: the time delay from the base station to the access terminal plus from the access terminal to the base station.

Figure 5:
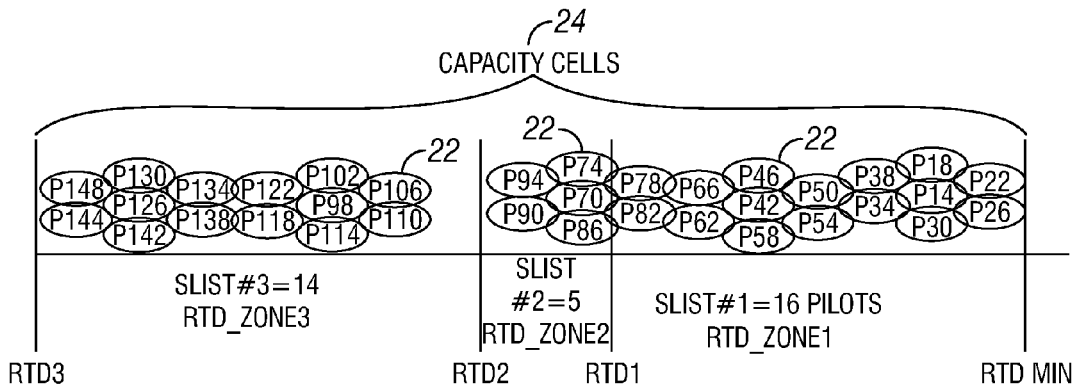
FIG. 5 shows capacity cells of three zones.
Figure 6:
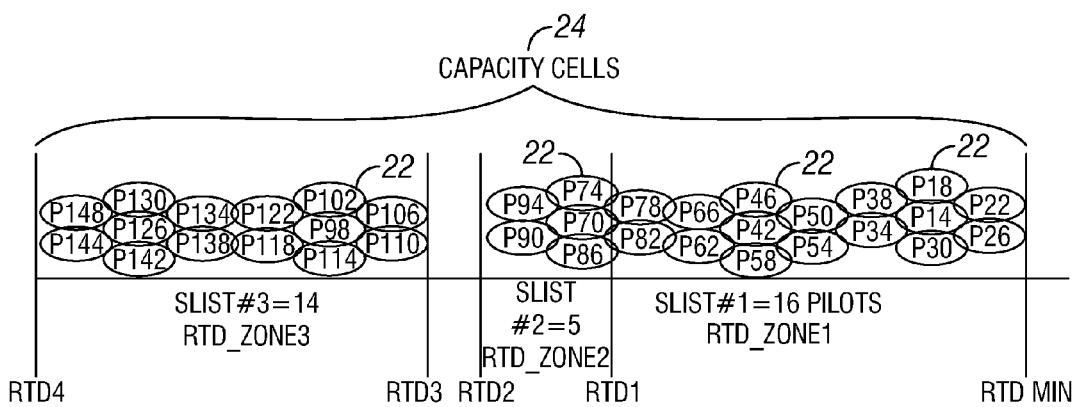
FIG. 6 shows capacity cells within at least four distinct RTDs.

If there is an RTD_zone3, it may be implemented as
RTD_zone3: RTD2<AT reported RTD<RTD3. See FIG. 5.
Or RTD_zone3: RTD3<AT reported RTD<RTD4. See FIG. 6.

Figure 7:
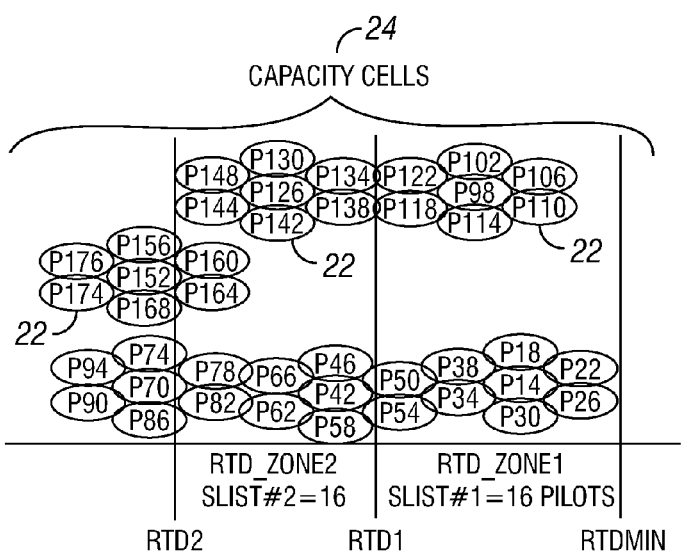
FIG. 7 shows capacity cells of two zones.

If the number of capacity cells 24 within a radial distance of the umbrella cell 20 is more than 16 cells, then the RTD_zone corresponding to the distance for satisfying the condition of search_list=16 will be reduced. See FIG. 7. The IS856 indicates that the maximum number of entries for the list of Pilot PNs in the RouteUpdateRequest message is 16. Therefore, the RNC sends out more than one search list, if the capacity cells 24 under the RF coverage of the umbrella cell 20/sector are more than 16 cells/sector.

Figure 8:
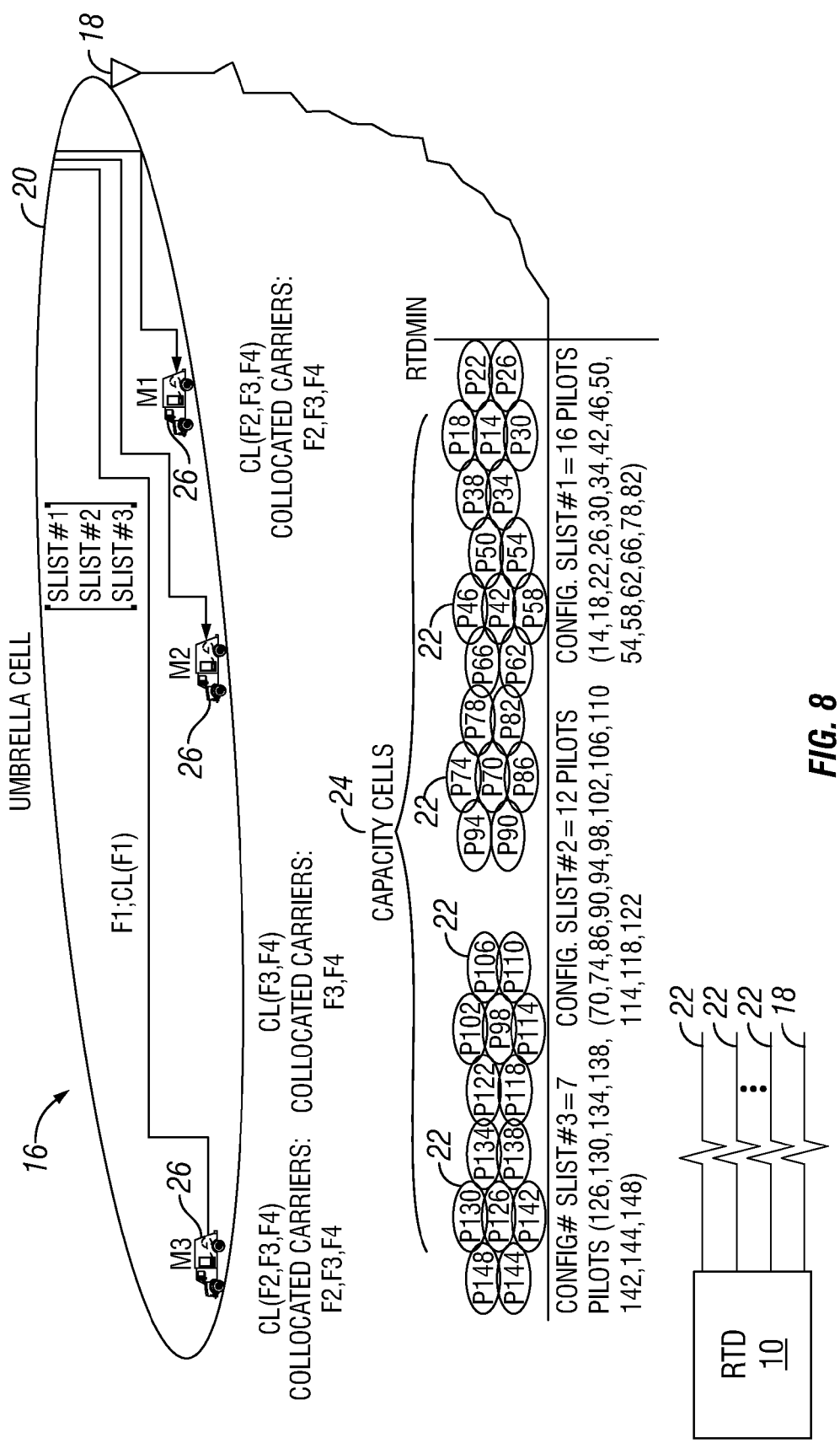
FIG. 8 shows an umbrella cell and capacity cells in regard to periodic round robin.

In regarding to sending Search_Lists in periodic round-robin fashion and FIG. 8, Periodic interval=*TDB* when AT reports RTD>RTDmin As mentioned above, the maximum entries in the list of pilots (or cells) in the RouteUpdateRequest message is 16. If more than 16 pilots (or cells) are needed to be sent to the AT 26, then more than one search list is needed. For example, if 32 cells or pilots information is needed to be sent for the AT 26 to search, then two search lists are required to be sent. Periodic interval=TBD (to be determined). This interval will be determined later during deployment phase. For the same example, two search lists will be sent to the AT 26. This first search list will be sent out, then the second search list will be sent out 2 seconds later. The same pattern will be repeated periodically. A unique Pilot PN is required for Search_Lists.

Figure 9:
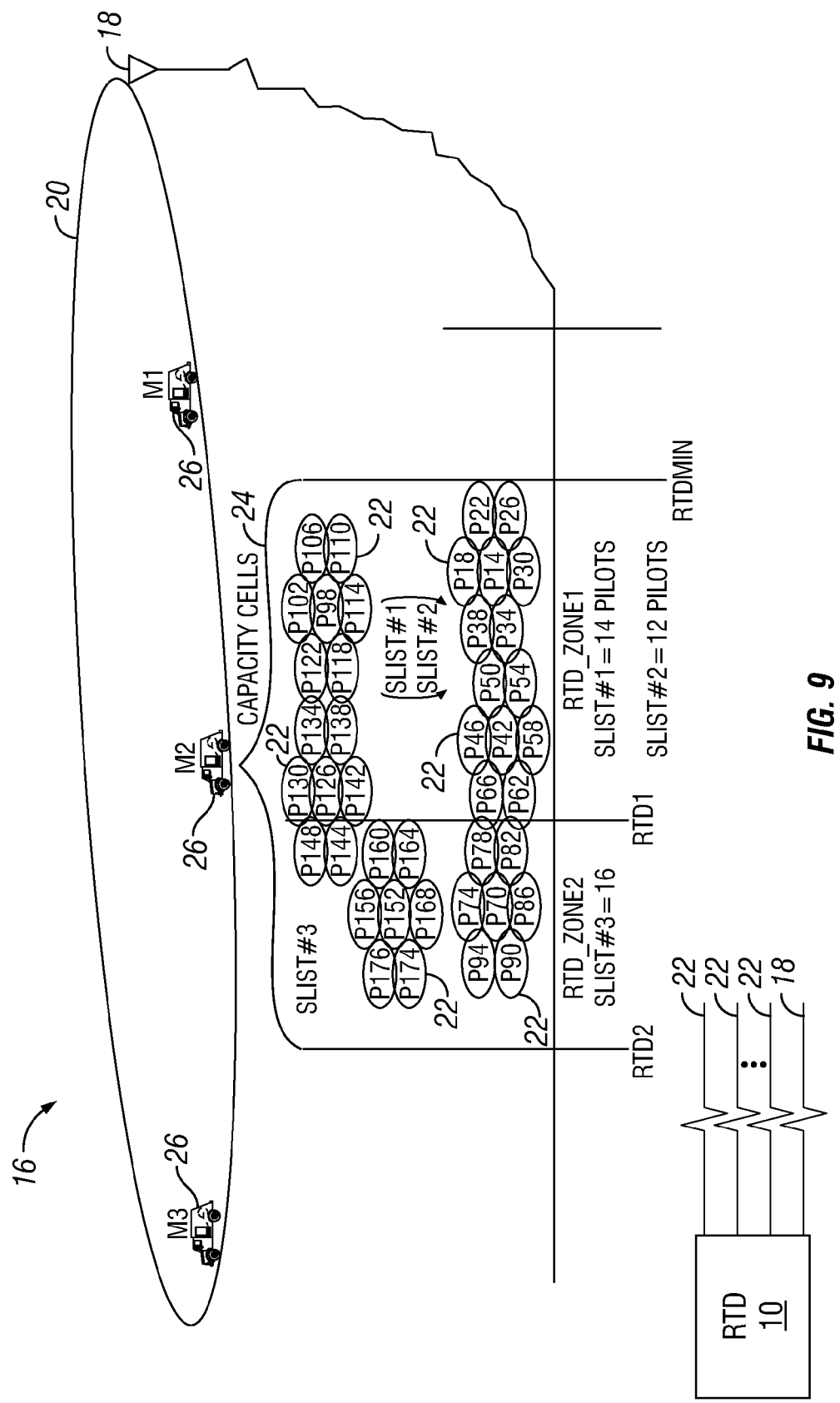
FIG. 9 shows an umbrella, cell and capacity cells per RTD and periodic round robin.

FIG. 9 shows sending Search_List(s) by method1 and method2 RTD and periodic round-robin method RTD_zone1: SList#1 and SList#2 will be sent if RTDmin<AT reported RTD<RTD1

RTD_zone2: SList#2 will be sent if RTD1<AT reported RTD<RTD3

Target Lists

Regarding Target List Construction, for Method1: Reported Pilot(s) above pilot_threshold plus Pilot(s) in the neighbor list. For Method2: Reported Pilot(s) above pilot_Threshold only.

For Method1:
If AT reports one pilot, built target list includes this pilot plus its first 5 pilots in its neighbor list.
If AT reported two pilots, built target list includes
First reported pilot+first 2 pilots in its neighbor list
Second reported pilot+first 2 pilots in its neighbor list
If AT reported 3 pilots, built target list includes
First reported pilot+first 1 pilot in its neighbor list
Second reported pilot+first 1 pilot in its neighbor list
Third reported pilot+first 1 pilot in its neighbor list
If AT reports more than 3 pilots
Built target list=reported pilots Strongest Pilot among reported pilots will be used as reference.

Note: It is required to have the Neighbor List to be data filled in priority order. That is, the target list should include the list of the most likely neighboring pilots of the reported pilot.

In summary:
RNC=radio network controller interfacing with a group of base stations. The group of base stations consists of an umbrella base station of the umbrella cell and the capacity base stations of the capacity cells.

The RNC engages at least one or more processing units.
The processing unit is used:
to provision a set of search-lists. The set of search lists should have at least one search-list
to determine when the set of search-lists should be sent
if periodic round-robin search-list method is used, the set of search-lists (in the RouteUpdateRequest Message) is sent via the umbrella base station of the umbrella cell to the active connection AT for instructing the active connection AT to measure the signal levels of capacity cells provisioned in the search-list when the AT reported RTD is greater than the predefined RTD threshold value (identified as RTDmin)
else if periodic round-robin and RTD-zone based search-list method is used, the set of search-lists is sent based on the specific zone. For example,
RTD-zone#1 is defined as when the active connection AT on the umbrella having its reported RTD is greater than or equal to the configured RTDmin and less the configured RTD1.
RTD-zone#2 is defined as when the active connection AT on the umbrella having its reported RTD is greater than or equal to the configured RTD1 and less the configured RTD2.
The processing unit is used to build the target list to redirect the active connection AT on the umbrella cell to capacity cells based on the eligible capacity cells that the AT reports (in the RouteUpdate Message).

The algorithm.
The processing unit is used the determined when the redirection is granteded/triggered (handoff).
The algorithm is: if the measured Ec/Io level of the strongest capacity cell (pilot) is >=the configured threshold of the reference umbrella cell, handoff to pilot cell.

ABBREVIATIONS

AT is the Access Terminal
CDMA is the Code Division Multiple Access
Ec is the energy per chip
Ec/Io (pilot strength) is the received pilot energy over one PN chip period (Ec) divided by the total power spectral density (Io) in the received bandwidth or the total received energy of the outer cells and in-cell in the received bandwidth RTD is the round trip delay: the time delay from the base station to the access terminal and from the access terminal to the base station Pilot PN is the pilot PN sequence Offset. In CDMA network, each cell or sector has a distinct Pilot PN offset number RUR is the Route Update Request message. It is used to request an AT to report pilot strength of the current Pilot PN and the neighbor Pilot PNs RUM is the Route Update Message. The AT uses RUM to report the measured pilot strengths of each pilot PN included in the RUR CL is the CDMA channel list message. The channel list message is used to advertize the list of CDMA channels in operation in a cell or sector to the access terminal in the cell or sector Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A method for a radio network controller of a wireless telecommunications network having an umbrella cell base station for an umbrella cell and capacity cell base stations for capacity cells within the umbrella cell comprising the steps of:
    sending a message from a network interface to the umbrella base station of the umbrella cell to search for capacity cells within the umbrella cell to redirect traffic of an access terminal (AT) from the umbrella cell to at least one of the capacity cells, including sending a RouteUpdateRequest message to the AT for the AT to search for capacity cells in the search list;
    receiving at the network interface from the umbrella base station eligible capacity cells to which traffic of the AT can be redirected, including receiving eligible capacity cells which have an Ec/Io power level greater than a predetermined Ec/Io power level; and
    selecting with a processing unit target capacity cells from the eligible capacity cells to which traffic of the AT will be redirected, including selecting each eligible capacity cell is a target cell when there are four or more eligible capacity cells, selecting at least one neighbor capacity cell of each eligible capacity cell and also the eligible capacity cell when there are between 1 and 3 eligible capacity cells, selecting 2 neighbor capacity cells for each eligible capacity cell and also the eligible capacity cell when there are 2 eligible capacity cells, selecting 1 neighbor capacity cell for each eligible capacity cell and also the eligible capacity cell when there are 3 eligible capacity cells, and selecting 5 neighbor capacity cells when there is only 1 eligible capacity cell and also the 1 eligible capacity cell.

2. The method as described in claim 1 including the step of redirecting the traffic of the AT from the umbrella cell to the target capacity cells.

3. The method as described in claim 2 wherein the sending step includes the step of creating at least one search list of capacity cells to search.

4. The method as described in claim 3 wherein the creating step includes the step of creating at least one search list based on round-trip delay.

5. The method as described in claim 3 wherein the creating step includes the step of creating at least one search list.

6. A radio network controller of a wireless telecommunications network having an umbrella cell base station for an umbrella cell and capacity cell base stations for capacity cells within the umbrella cell comprising:
    a network interface from which a message is sent to the umbrella base station of the umbrella cell to search for capacity cells within the umbrella cell to redirect traffic of an access terminal (AT) from the umbrella cell to at least one of the capacity cells, and at which eligible capacity cells to which traffic of the AT can be redirected is received, the network interface sends the message to the umbrella base station to send a RouteUpdateRequest message to the AT for the AT to search for capacity cells in the search list, the network interface receives eligible capacity cells which have an Ec/Io power level greater than a predetermined Ec/Io power level; and
    a processing unit which selects target capacity cells from the eligible capacity cells to which traffic of the AT will be redirected, the processing unit selects each eligible capacity cell as a target cell when there are four or more eligible capacity cells, the processing unit selects at least one neighbor capacity cell of each eligible capacity cell and also the eligible capacity cell when there are between 1 and 3 eligible capacity cells, the processing unit selects 2 neighbor capacity cells for each eligible capacity cell and also the eligible capacity cell when there are 2 eligible capacity cells, selecting 1 neighbor capacity cell for each eligible capacity cell and also the eligible capacity cell when there are 3 eligible capacity cells, and selecting 5 neighbor capacity cells when there is only 1 eligible capacity cell and also the 1 eligible capacity cell.

7. The controller as described in claim 6 wherein the processing unit causes the traffic of the AT from the umbrella cell to be redirected to the target capacity cells.

8. The controller as described in claim 7 wherein the processing unit creates at least one search list of capacity cells to search.

9. The controller as described in claim 8 wherein the processing unit creates at least one search list based on round-trip delay.

10. The controller as described in claim 9 wherein the processing unit creates at least one search list.

* * * * *